Oct. 1, 1935.  A. M. NEY  2,015,688
DRIVE MECHANISM
Filed Oct. 19, 1933  2 Sheets-Sheet 1
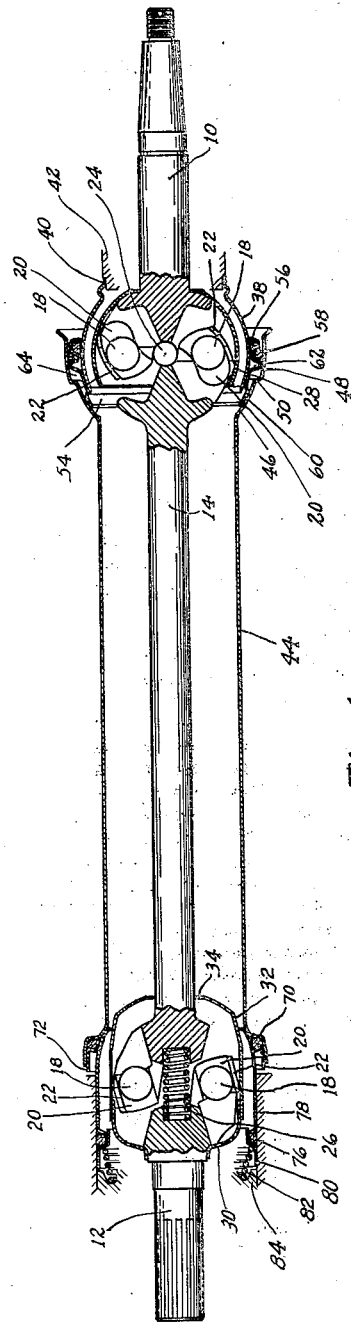
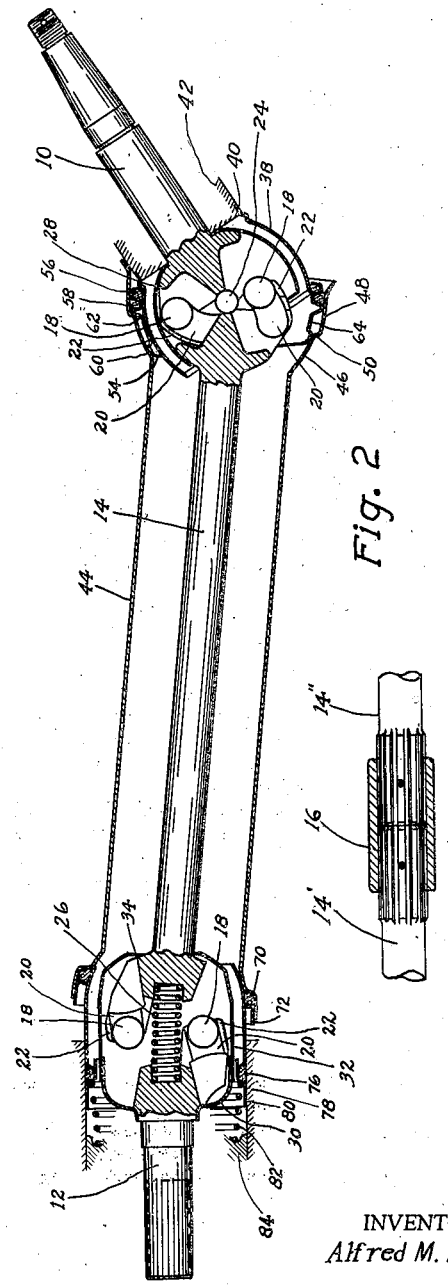
INVENTOR.
Alfred M. Ney
BY
ATTORNEY.

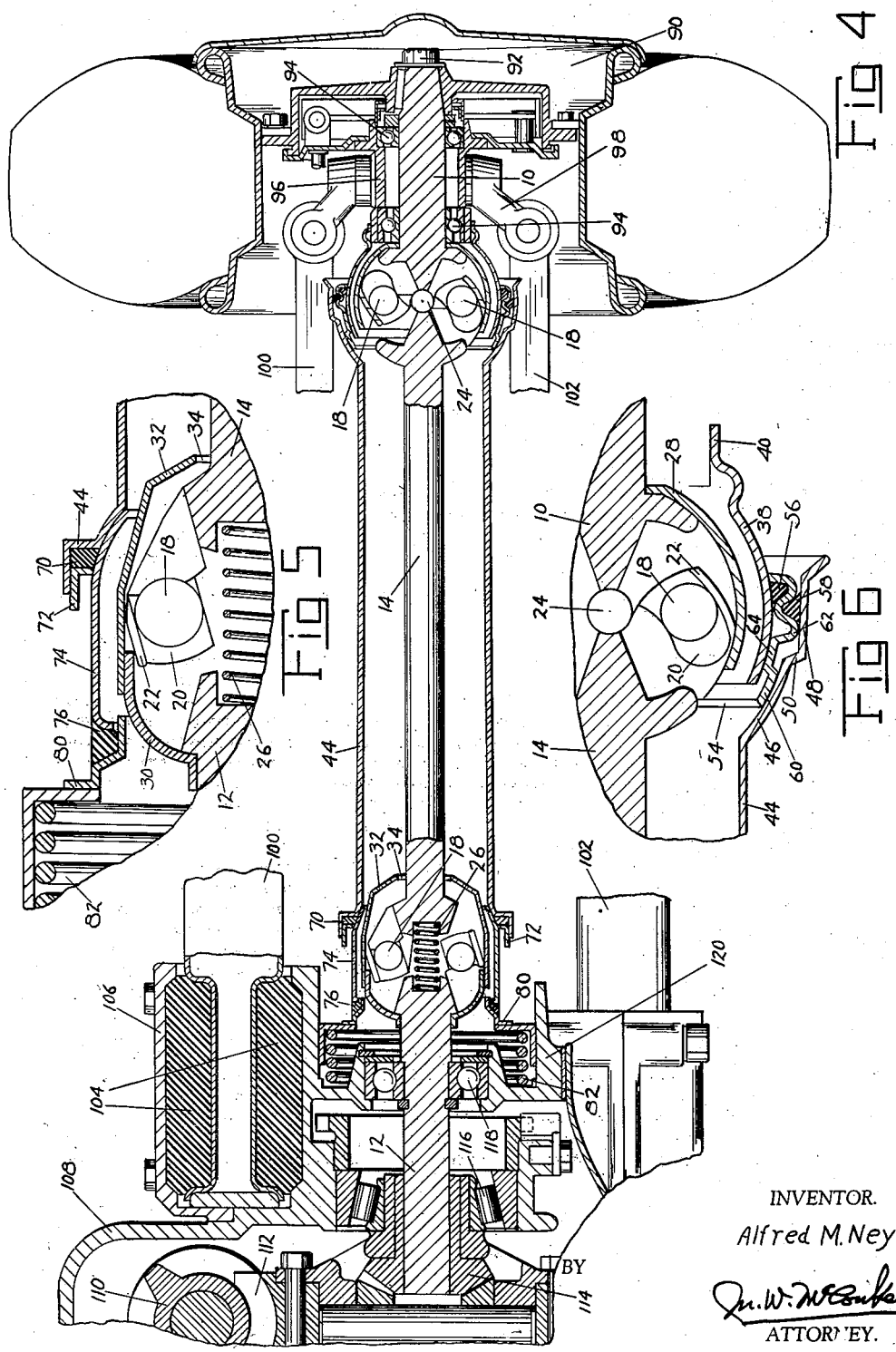

Patented Oct. 1, 1935

2,015,688

UNITED STATES PATENT OFFICE 2,015,688

DRIVE MECHANISM

Alfred M. Ney, St. Joseph, Mich., assignor to The Steel Wheel Corporation, Chicago, Ill., a corporation of New York Application October 19, 1933, Serial No. 694,244

12 Claims. (Cl. 64—29)

This invention relates to drive mechanisms, for the front wheels of automobiles and the like, and is illustrated as embodied in a novel assembly of universally-jointed shafts and a universally-jointed housing therefor.

One object of the invention is to provide a novel assembly including a short wheel-driving shaft and a differential-driven inner shaft connected by a floating drive shaft which has at its opposite ends universal joints connecting it to the first two shafts, and having shells or other coupling members at the joints which prevent unintentional separation of the shafts without interfering with the universal joint action. One of the coupling members, preferably the one adjacent the differential-driven shaft, is arranged to permit a considerable relative axial movement of the shafts, but not enough to permit either of them to disengage itself.

This arrangement permits handling the three shafts and their connecting joints as an assembled unit, and is especially advantageous when used with an enclosure or housing which is jointed to permit relative movement of the shafts, and which is large enough to permit the entire shaft and joint assembly to be removed endwise through the outer end of the housing. A related feature of the invention has to do with forming the sectional housing so that it may also be removed and replaced readily.

An important feature of the invention relates to the sealing of the joints of the sectional tubular housing which protects the above-described shaft assembly. This is accomplished by the use of novel sealing rings, preferably spun or stamped from sheet metal, having mounted therein non-metallic packings having peripheral sealing engagement with the parts of the housing.

In the case of the outer joint, i. e. the one at the swiveling axis of the front wheel, the two sections of the housing have interfitting spherical portions (preferably with the larger and outer one on the section surrounding and housing the above-described floating drive shaft), and the novel sealing means is arranged between these interfitting portions. I prefer to construct the sealing means in the form of a floating ring having non-metallic packings, one of which is in peripheral external sealing engagement with the inner spherical part and the other of which is in peripheral internal sealing engagement with the outer spherical part.

In one desirable arrangement, this ring has two annular portions, shown as of different diameters, fitting within corresponding portions of the outer spherical part, the larger one being adapted for engagement with an annular shoulder on said outer part, to limit the floating movement of the ring. There may be an intermediate portion of smaller diameter fitting over the inner one of the spherical parts.

The above and other objects and features of the invention, including novel means for holding the various parts under a spring loading, to take up play, without displacing them relatively to the swiveling axis of the wheel, and other novel combinations of parts and desirable particular constructions, will be apparent from the following description of the illustrative embodiment shown in the accompanying drawings, in which:

Figure 1 is a vertical section through the assembly of shafts and joints and their jointed tubular housing;

Figure 2 is a horizontal section through the same parts, but with the wheel-driving shaft swiveled to one extreme position;

Figure 3 is a detail view of an alternative shaft construction;

Figure 4 is a section showing the shaft and housing assembly arranged to drive the front wheel of an automobile;

Figure 5 is a detail enlarged section showing part of the shaft and housing arrangement at the differential end; and Figure 6 is a similar detail enlarged section showing such parts at the wheel end.

The novel shaft and joint and housing assembly, in the particular embodiment selected for illustration in the drawings, is intended for use in the automobile fully described in application No. 651,821, filed January 14, 1933, by Victor W. Kliesrath, although it is not of course my intention to limit its use to that particular automobile, which is referred to merely by way of illustration of one use of my novel assembly.

When so used, the righthand part of Figures 1 and 2 herein corresponds to and shows parts intended to replace the shaft and joint and housing parts shown in Figure 12 of the said Kliesrath application; while the lefthand part of these figures corresponds to and shows parts intended to replace the shaft and joint and housing parts shown in Figure 18 of the Kliesrath application.

In this particular embodiment, there are three shafts arranged end to end, viz.: (1) a short wheel-driving shaft or spindle 10, (2) a short differential-driven shaft 12, and (3) an intermediate floating drive shaft 14 universally jointed at its ends to the first two shafts respectively. If desired, and as shown in Figure 3, the shaft 14 may be in the form of two sections 14' and 14" rigidly connected by a sleeve 16.

The universal joints shown are those known commercially as Weiss joints, and include as driving elements suitable balls or rolling members 18 arranged in intersecting relatively-inclined half-grooves 20 formed in fingers 22 which are shown integrally forged or otherwise provided on the ends of the shafts. As is well known in this type of joint, the balls are held by the intersecting grooves in a plane which bisects the angle between the shafts, and therefore transmit uniform angular motion from the driving to the driven shafts.

The balls also roll in the grooves to permit a limited relative axial motion of the shafts, in the usual manner. I prefer, however, in order to avoid displacement of the parts adjacent the wheel relatively to the swiveling axis of the wheel, to limit this relative axial movement to the joint at the differential end of the assembly.

To this end, the shafts 10 and 14 are held against relative axial displacement, for example being formed at their adjacent ends with spherical sockets embracing between them a thrust ball 24. Shaft 14 is urged axially outward against the ball 24, to hold it against the shaft 10 (which latter in turn is held in place by the wheel mounting and spring suspension) by means such as a compressed coil spring 26 confined between the adjacent ends of the shafts 12 and 14. Shafts 12 and 14 are shown formed with sockets receiving the ends of the spring 26. The spring 26 also holds all of the shafts and joints under a spring loading.

With the particular joint illustrated, the wheel-driving shaft 10 is intended to be swiveled through a maximum angle of 38° in one direction and 40° in the other direction, relatively to the shaft 14. The larger maximum angle is when the wheel driven by the shaft 10 is on the inside of a turn, and the smaller one when it is on the outside.

According to one feature of the invention, the three shafts are connected to form a readily removable and replaceable unit, by means permitting the above-described relative axial movement of shafts 12 and 14 but without interfering with the necessary relative displacement of the shafts. In the arrangement illustrated, shaft 10 has pressed thereon a spherical shell 28 which slidably embraces the joint between shafts 10 and 14, including the externally-spherical fingers 22 of the shaft 14, and substantially holds these two shafts together end to end in a manner preventing relative axial movement without interfering with relative angular displacement. The shell 28 may be spun or stamped from sheet metal.

Similarly the differential-driven shaft 12 (shown splined for direct driving engagement with the corresponding gear of the differential) has pressed thereon a shell in two parts 30 and 32, which may be welded or otherwise secured together. A comparison of Figures 1 and 2 will show that this shell permits a considerable relative axial movement of the two shafts, although at the maximum of such movement as shown in Figure 2 the shafts are still positively drivably connected by the balls 18. The opening 34 in the half 32 is large enough not to interfere with the maximum angular displacement of the shaft 14.

Preferably the above-described shaft assembly is inclosed in a novel sectional protective housing of large enough diameter to permit the entire shaft assembly to be removed endwise as a unit from the wheel (or outer) end of the housing. I prefer also to construct the housing itself so that it may be disassembled from the wheel end.

The illustrated housing includes an outer section 38, externally spherical for the most part but having a tubular central portion 40 pressed over a corresponding boss 42 formed on the wheel knuckle 44 in which the shaft 10 is journaled. The section 38 may be stamped or spun or otherwise formed from sheet metal.

The central part of the housing, inclosing the shaft 14, is a tubular section 44, the outer end of which is shown with a small-diameter spherical portion 46 and a larger-diameter spherical portion 48 integrally connected by an annular shoulder 50. Both of the portions 46 and 48 are larger in diameter than the spherical section 38, which fits inside of them.

Between the inner spherical part 38 and the outer spherical part 46—48, I arrange novel floating sealing means, preferably including a floating ring 54, stamped or spun from sheet metal, and which has mounted thereon two non-metallic packings 56 and 58 of rubber or other material. The packing 56 is arranged in external peripheral sealing engagement with the inner spherical shell 38, and the packing 58 is arranged in internal peripheral sealing engagement with the large-diameter portion 48 of the outer spherical shell.

The ring 54 is shown formed with spaced annular portions or ribs 60 and 62, of such diameters as to fit respectively snugly within the small and large diameter portions 46 and 48, with the larger rib 62 arranged for engagement with the annular shoulder 50 at its two extremes to limit the movement of the floating sealing means just described. There is shown an intermediate portion 64 snugly fitting over the inner spherical part 38. The rib 62 serves as one wall of a groove in which the packing 58 is seated.

The entire tubular section 44 is urged axially outward, by means described below, to hold the spherical surface 46 yieldingly against the rib 60 of the floating ring 54, and to hold the surface 64 of the floating ring 54 yieldingly against the inner spherical part 38, thereby holding all the parts under spring loading without putting any undue pressure on either of the packings 56 or 58.

The inner end of the tubular section 44 is formed with a shouldered seat for a non-metallic packing 70 which is held in the seat by means such as a ring 72 pressed into the end of the section 44 and if desired welded or otherwise secured in place.

The packing 70 is in external peripheral sealing engagement with a rolled or drawn metal end section 74 which is turned downwardly at its end to form a shoulder engaged by another non-metallic packing 76 which is in internal peripheral sealing engagement with the wall 78 of the opening in the differential housing through which the shaft 12 passes.

The packing 76 is held in place by being seated on the edge of an L-section ring 80 fitting within the opening 78. The ring 80 is urged axially outward by a compressed coil spring 82 confined between the ring and an adjacent part 84 of the differential housing. The spring 82 holds all of the housing parts spring loaded, as above described.

Figure 4 shows my novel assembly in place as the front drive of an automobile such as described in the above-identified Kliesrath application, the parts at and adjacent the differential being exaggerated in size to show them more clearly. In this case, the shaft section 10 is supported by a wheel 90 having a conical hub keyed to the end of the shaft and held by a nut or the like 92. The shaft section 10 is journaled in ball bearings 94, seated in a tubular portion 96 of a knuckle swiveled on a vertical carrier 98.

The carrier 98 is pivoted at top and bottom to rigid links 100 and 102 movably seated at their ends (for example between rubber blocks 104) in sockets 106 forming rigid parts of a powerplant casing 108 forming the load-carrying element of the chassis.

The casing 108 contains a driving worm 110 meshing with a worm wheel 112 forming the driving element of a differential, the one side gear 114 of which supports and is keyed to the shaft section 12. The gear 114 is shown journaled in a roller bearing 116 and the shaft section 12 in a ball bearing 118.

In this case, a boss 120 on the power plant casing is the supporting part noted at 78 in Figures 1 and 2, while the knuckle portion 96 corresponds to the support indicated at 42 in those figures.

While one illustrative embodiment has been described in detail, it is not my intention to limit the scope of the invention to that particular embodiment, or otherwise than by the terms of the appended claims.

I claim:

1. A universally-jointed shaft assembly for a front-wheel drive or the like comprising three shafts arranged end to end and having two universal joints connecting them, a three-section housing enclosing the shafts and having joints opposite the universal joints, and seals for the joints of said housing at least one of which is in the form of a floating ring-shaped device having two packings one of which encircles one section of the housing and in sealing engagement therewith and the other of which is seated within the adjacent housing section and in sealing engagement therewith.

2. A universally-jointed tubular housing for a vehicle drive or the like comprising tubular sections arranged end to end and having at their adjacent ends spherical portions one of which fits inside the other, and means for sealing said interfitting spherical portions comprising a floating ring-shaped device having two packings one of which is in external peripheral sealing engagement with the inner one of said spherical portions and the other of which is in internal peripheral sealing engagement with the outer one of said spherical portions.

3. A tubular housing for a vehicle drive or the like comprising spherical portions one of which fits inside the other, and means for sealing said interfitting spherical portions comprising a floating ring-shaped stamping having non-metallic sealing rings of packing material seated therein and one of which rings is in external peripheral sealing engagement with the inner one of said spherical portions and the other of which rings is in internal peripheral sealing engagement with the outer one of said spherical portions.

4. A tubular housing for a vehicle drive or the like comprising spherical portions one of which fits inside the other, and means for sealing said interfitting spherical portions comprising a floating ring-shaped stamping having non-metallic sealing rings of packing material seated therein and one of which rings is in external peripheral sealing engagement with the inner one of said spherical portions and the other of which rings is in internal peripheral sealing engagement with the outer one of said spherical portions, said spherical portions being formed with annular shoulders forming limiting stops for the sealing means.

5. A tubular housing comprising sections having interfitting spherical parts, the outer one of which has portions of different diameters connected by an annular shoulder, and sealing means between said parts comprising a ring having a pair of spaced annular portions of different diameters fitting within the different-diameter portions of the outer spherical part and with the larger-diameter portion of the ring engageable with the annular shoulder of said part to limit the movement of the sealing means, a non-metallic packing mounted in said ring and in sealing engagement with the inside surface of the outer spherical part, and a second packing in said ring in sealing engagement with the outer surface of the inner spherical part.

6. A tubular housing comprising sections having inter-fitting spherical parts and sealing means between said parts comprising a ring having a pair of spaced annular portions fitting within the outer spherical part and having an intermediate annular part fitting over the inner spherical part, a non-metallic packing mounted in said ring and in sealing engagement with the inside surface of the outer spherical part, and a second packing in said ring in sealing engagement with the outer surface of the inner spherical part.

7. A tubular housing comprising sections having interfitting spherical parts, the outer one of which has portions of different diameters connected by an annular shoulder, and sealing means between said parts comprising a ring having a pair of spaced annular portions of different diameters fitting within the different-diameter portions of the outer spherical part and with the larger-diameter portion of the ring engageable with the annular shoulder of said part to limit the movement of the sealing means.

8. A front-wheel drive shaft and housing assembly comprising a wheel-engaging outer driving shaft and a differential-driven shaft and an intermediate drive shaft connected at its ends by universal joints to the first two shafts, a shell carried by the first shaft and encircling the corresponding universal joint and the adjacent end of the drive shaft and preventing their separation axially of the shafts without interfering with relative angular displacement of the shafts about the universal joint, a second shell carried by the differential-driven shaft and similarly encircling the other universal joint and the other end of the drive shaft but which has sufficient play to permit relative endwise movement of said shafts without disengaging either of them from the universal joint, and a tubular sectional housing for the shafts and joints large enough in diameter to permit the three shafts and the two joints and the shells connecting them to be removed as a unit endwise from the outer end of the housing.

9. A front-wheel drive shaft assembly comprising a wheel-engaging outer driving shaft and a differential-driven shaft and an intermediate drive shaft connected at its ends by universal joints to the first two shafts, a shell carried by the first shaft and encircling the corresponding universal joint and the adjacent end of the drive shaft and preventing their separation axially of the shafts without interfering with relative angular displacement of the shafts about the universal joint, and a second shell carried by the differential-driven shaft and similarly encircling the other universal joint and the other end of the drive shaft but which has sufficient play to permit relative endwise movement of said shafts without disengaging either of them from the universal joint, whereby the three shafts and the two joints and the shells connecting them may be removed and handled as a unit.

10. A floating sealing ring, for a front-wheel drive or the like including a housing in a plurality of connected sections one of which has a spherical end and another of which sections is of spherical formation and associated with said spherical end, having an external rib for yielding engagement by the interior of said spherical end of one section of the housing, and an adjacent smaller-diameter interior surface to engage the spherical exterior of said other section of the housing, and having external and internal non-metallic packings for sealing engagement respectively with the interior of said spherical end and the exterior of said other section.

11. A floating sealing ring, for a front-wheel drive or the like including a housing in a plurality of connected sections one of which has a spherical end and another of which sections is of spherical formation and associated with said spherical end, having an external rib for yielding engagement by the interior of said spherical end of one section of the housing, and an adjacent smaller-diameter interior surface to engage the spherical exterior of said other section of the housing, and having external and internal non-metallic packings for sealing engagement respectively with the interior of said spherical end and the exterior of said other section, and which has an outwardly-projecting rib for engagement with an annular stop within said spherical end, to limit the floating of said ring.

12. A sectional housing having two sections yieldingly urged axially toward each other under spring pressure and having interfitting spherical ends, and a floating sealing device arranged between said ends and in direct engagement with both of them to transmit the spring pressure from the one to the other and having non-metallic packings in sealing engagement with said ends respectively and which packings are relieved from said spring pressure.

ALFRED M. NEY.